UNITED STATES PATENT OFFICE.

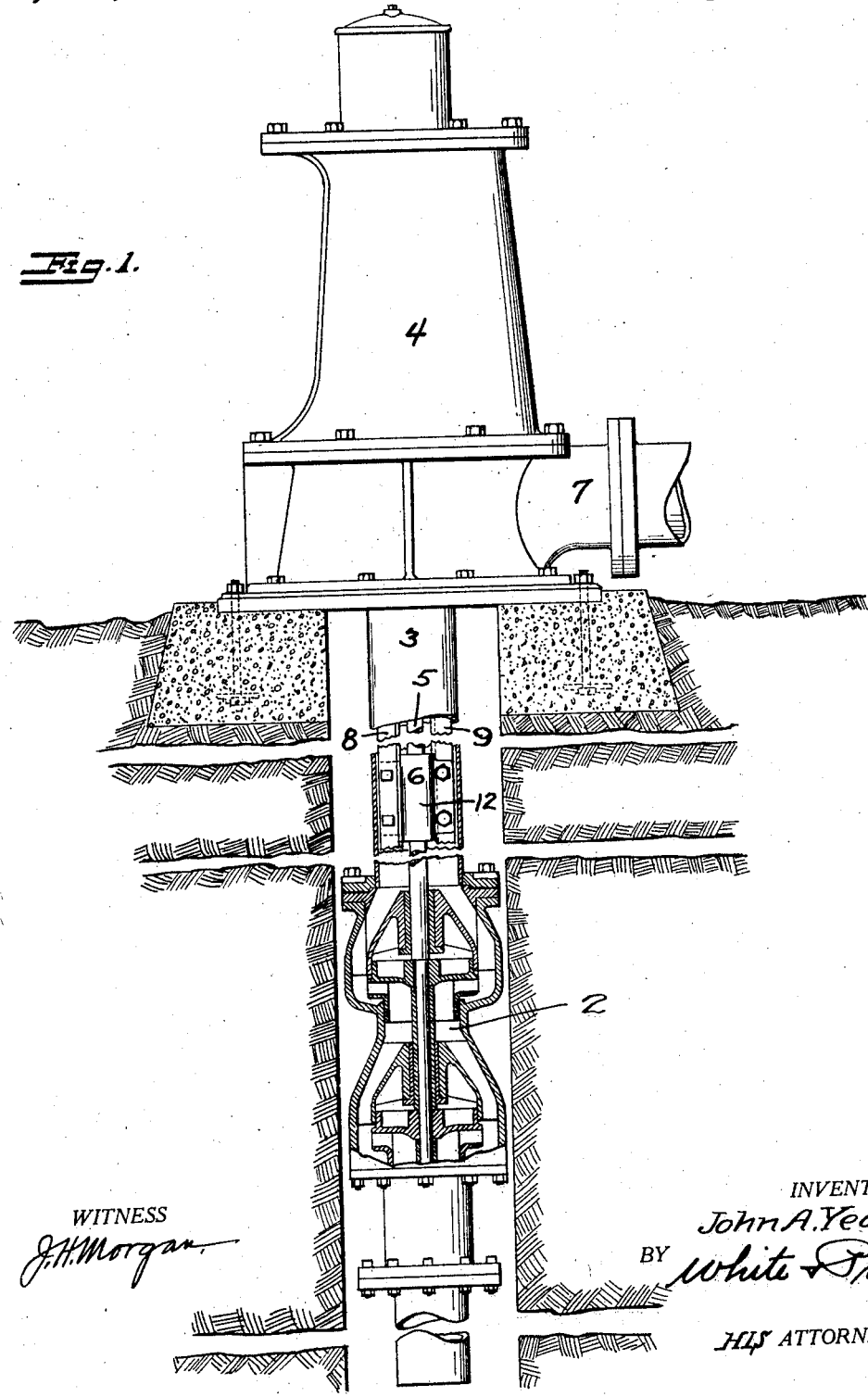

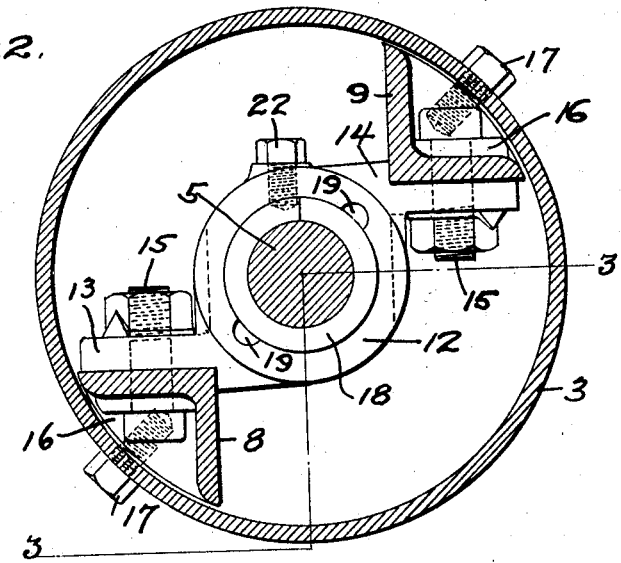
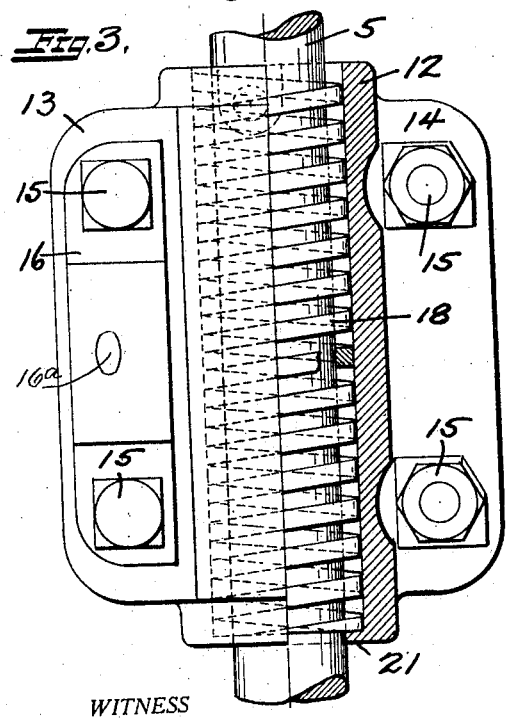

JOHN A. YEATMAN, OF OAKLAND, CALIFORNIA, ASSIGNOR TO UNITED IRON WORKS, OF OAKLAND, CALIFORNIA, A CORPORATION OF CALIFORNIA.

BORE-HOLE PUMP.

1,389,414. Specification of Letters Patent. Patented Aug. 30, 1921.

Application filed March 13, 1919. Serial No. 282,310.

*To all whom it may concern:*

Be it known that I, JOHN A. YEATMAN, a citizen of the United States, and a resident of Oakland, county of Alameda and State of California, have invented certain new and useful Improvements in Bore-Hole Pumps, of which the following is a specification.

The invention relates to bore hole pumps and particularly to the bearings for the drive shafts of such pumps.

An object of the invention is to provide a simple and efficient supporting structure for the bearings of the drive shaft.

Another object of the invention is to provide a drive shaft bearing which will not be deleteriously affected by the sand and grit in the water or other liquid being pumped.

A further object of the invention is to provide a bearing through which the water is continuously circulated and by which the bearing is lubricated.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one form of the structure of my invention, but it is to be understood that I do not limit myself to such form, since the invention, as expressed in the claim, may be embodied in a plurality of forms.

Referring to said drawings:

Figure 1 is an elevation, partly in section, of a bore hole pump embodying my invention, part of the drop-pipe being broken away to reduce the size of the figure.

Fig. 2 is a cross section through the drop-pipe taken immediately above a shaft bearing.

Fig. 3 is a vertical section through the bearing, taken on the line 3—3, Fig. 2, the helical bearing element being shown in full.

In bore hole pumps, considerable difficulty has been experienced in keeping the sand and grit in the water from entering the drive shaft bearings and in lubricating bearings. In accordance with my invention, I make no effort to keep the water from the bearings and provide means for maintaining a constant circulation of water through the bearings. The bearings are thereby water lubricated and the continued flow of water prevents the sand and grit from lodging on the bearing surface. By permitting the water to have free access to the bearings, a much cheaper pump shaft supporting structure is provided than when the bearings were sealed against water contact and the necessity for oil lubrication of the bearings is eliminated.

The bore hole pump of my invention comprises the centrifugal pump 2 which is supported in the bore hole by the drop-line 3 which extends downward in the bore hole from the driving and supporting head 4 and to which the pump is secured. Extending downward through the drop pipe is the drive shaft 5, which is provided at intervals with bearings 6. The water is pumped upward through the drop pipe and discharges through the outlet 7 in the head.

The drive shaft bearings 6 are supported in an open frame composed of two angle irons 8—9, which are secured together at intervals by the bearing shells 12. The angle irons are so spaced by the bearing shells that the frame thus formed fits into the drop pipe 3 without any material side play. Each bearing shell is provided with diametrically oppositely placed wings or lugs 13—14, which are secured to the angles 8—9 by the bolts 15, thereby providing a rigid structure. Secured to the angle irons by the bolts 15, are plates or members 16, having tapped holes 16ª therein, into which extend cap-screws 17, which pass through the drop pipe. These screws secure the bearings or the bearing frame to the drop pipe at intervals, holding the bearing frame in place and forming a rigid structure. The bearing supporting frame is open, so that the water pumped has free access to the bearings.

The bearing shell has a bore therethrough of greater diameter than the drive shaft, through which the drive shaft extends, and interposed between the drive shaft and the bearing shell, is a helical element 18, which provides the bearing surface. The helical element is formed of a strip of iron, rectangular in cross section, so that it provides the required bearing surface and is preferably case hardened. The convolutions of the helix are spaced apart vertically to provide for circulation of water around the shaft. Formed in the bore of the shell are one or more vertical grooves 19 which open at the top and bottom of the shell. In operation, the bearing acts as a skin friction pump, causing a circulation of the water in the helical passage between the convolutions of the helix and thereby driving the sand and grit outward into the grooves 19, through which it flows from the bearing.

At the bottom of the bore, the shell is provided with a shoulder 21 upon which the lower end of the helical bearing element rests. The element is prevented from rotating by a cap screw 22 extending through the shell into the bore.

I claim:

The combination with a bore hole pump and a drop pipe through which the water pumped passes, of a drive shaft for said pump disposed within said pipe, bearing shells surrounding said shaft, helical bearing members having spaced convolutions arranged in said shells and surrounding said shaft, diametrically disposed angle irons arranged longitudinally in said pipe, and means securing said bearing shells to said angle irons.

In testimony whereof, I have hereunto set my hand at San Francisco, California, this 27th day of February, 1919.

JOHN A. YEATMAN.

In presence of—
H. G. PROST.